(12) United States Patent
Cho et al.

(10) Patent No.: US 10,580,067 B1
(45) Date of Patent: Mar. 3, 2020

(54) GAS CYLINDER LEASE SYSTEM

(71) Applicants: Chun-Ming Cho, New Taipei (TW); Chun-Hsien Cho, New Taipei (TW)

(72) Inventors: Chun-Ming Cho, New Taipei (TW); Chun-Hsien Cho, New Taipei (TW)

(*) Notice: Subject to any disclaimer, the term of this patent is extended or adjusted under 35 U.S.C. 154(b) by 0 days.

(21) Appl. No.: 16/185,758

(22) Filed: Nov. 9, 2018

(51) Int. Cl.
*G06Q 30/06* (2012.01)
*A47F 3/02* (2006.01)
*A47F 10/02* (2006.01)
*G06K 7/14* (2006.01)
*G05B 15/02* (2006.01)

(52) U.S. Cl.
CPC .......... *G06Q 30/0645* (2013.01); *A47F 3/02* (2013.01); *A47F 10/02* (2013.01); *G05B 15/02* (2013.01); *G06K 7/1413* (2013.01); *A47F 2010/025* (2013.01)

(58) Field of Classification Search
CPC .. G06Q 30/0645; G06K 7/1413; G05B 15/02; A47F 10/02; A47F 2010/025; A47K 3/02
USPC .................................................. 700/231–244
See application file for complete search history.

(56) References Cited

U.S. PATENT DOCUMENTS

| | | | | |
|---|---|---|---|---|
| 3,179,224 A | * | 4/1965 | Haupt, Sr. ............. | G07F 7/0609 194/226 |
| 5,829,630 A | * | 11/1998 | Fernald ................. | G07F 7/0609 221/66 |
| 6,192,296 B1 | * | 2/2001 | Colmant ................ | F17C 13/02 700/214 |
| 6,474,592 B1 | * | 11/2002 | Shnaps .................. | F41G 3/142 102/211 |
| 6,553,128 B1 | * | 4/2003 | Jouvaud ................ | G06Q 10/087 340/5.2 |
| 7,909,206 B2 | * | 3/2011 | Davis, Jr. ............... | G07F 7/0609 221/102 |
| 8,113,382 B1 | * | 2/2012 | Piersant ................ | G07F 7/0609 221/102 |
| 10,008,068 B2 | * | 6/2018 | Halsey, Jr. ............. | G07F 9/006 |
| 2015/0315813 A1 | * | 11/2015 | Gallo ..................... | E05B 35/12 292/229 |

* cited by examiner

*Primary Examiner* — Michael Collins

(74) *Attorney, Agent, or Firm* — Muncy, Geissler, Olds & Lowe, P.C.

(57) ABSTRACT

A gas cylinder lease system is disclosed, comprising one or more lease equipments and a cloud server equipment, wherein the inside of the lease equipment is installed with at least one placement rack area for accommodating the gas cylinder; accordingly, after any one of the lease equipments has been rented and at least one gas cylinder has been taken out, the renter may subsequently return the used gas cylinder to the lease main rack located at the same or different locations, with the use status of each placement rack area being uploaded to the cloud server equipment in real-time thereby monitoring the operation status of each lease equipment and executing corresponding replenishment and maintenance tasks in a timely fashion.

15 Claims, 6 Drawing Sheets

GAS CYLINDER LEASE SYSTEM

BACKGROUND OF THE INVENTION

1. Field of the Invention

The present invention generally relates to a gas cylinder lease system; in particular, it relates to a gas cylinder lease system capable of combining gas cylinders with lease equipments for practicing rentals or sales business.

2. Description of Related Art

Mountaineering is beneficial for promoting physical and mental health, allowing to strengthen functions of heart, lung, blood and other tissues or organs and to enhance individual physical capabilities and endurance. It is a leisure activity worth encouraging. However, according to certain international research reports, alpine pulmonary edema may potentially occur at a height of more than 2,440 meters, alpine cerebral edema at a height of more than 2,750 meters, and acute mountain sickness at 3,000 meters or above, which are very common illnesses for high mountain travels.

Therefore, oxygen supply may become very critical, which can prevent high altitude diseases such as high altitude sickness and high altitude pulmonary edema due to hypoxia issues by means of inhaling sufficient oxygen. In addition, it can also be applied to perform treatments and first aid processes for acute high altitude sickness caused by high altitude hypoxia, e.g., high altitude sickness, high altitude pulmonary edema and high altitude cerebral edema. It is appreciable that, in addition to the aforementioned prevention and first aid processes of high altitude diseases, oxygen can be further utilized for other purposes, such as first aid processes in cardiopulmonary patients, home oxygen therapy, daily health care for pregnant women, and recovery of brain fatigue, etc.

Moreover, not simply oxygen, the use of carbon dioxide is becoming more comprehensive as well, such as infusion into various beverages to increase the pressure, so that bubbles may appear in the drinks thereby improving the taste thereof; soda, beer or the like are significant examples, to name a few. Hence, the demand for carbon dioxide is growing, too.

But, accessing the storage gas cylinders of oxygen or carbon dioxide may be quite inconvenient, and after rented, to return such gas cylinder may also become a big problem. As such, the invention would be an optimal solution if the gas cylinders can be combined with a rental equipment for rental, sale and return operations thereby facilitating renter's acquisition and return processes.

SUMMARY OF THE INVENTION

A gas cylinder lease system according to the present invention is disclosed, comprising one or more lease equipments including a lease main rack, internally configured with one or more placement rack areas, and each placement rack area being installed with an openable door plate on the surface of the lease main rack, in which each placement rack area accommodates a gas cylinder, and the surface of the gas cylinder includes at least an identification label; at least one control device, installed on the inside of the lease main rack thereby controlling the operations of the lease equipment, and the control device provides the network connection function so as to receive and transfer information via networks; at least one automatic open/close device, installed between the openable door plate and the placement rack area and electrically connected to the control device, in which the automatic open/close device is used to automatically open or close the openable door plate; at least one label scanner device, installed on the inside of the lease main rack and electrically connected to the control device, thereby scanning the identification label on the surface of the gas cylinder, and then the scanned gas cylinder information can be sent back to the control device; at least one air detector device, installed on the inside of the lease main rack and electrically connected to the control device, thereby detecting the air data within the lease main rack, and then the scanned air information can be sent back to the control device; a cloud server equipment, performing connections with the lease equipment, and including: an equipment information management and control unit, used to receive and record the internal status information of the lease equipment for the purpose of management and control, in which the internal status information of the lease equipment includes at least the number of gas cylinders, gas cylinder information and air data, and the equipment information management and control unit is capable of recording the position of each lease equipment and updating in real-time the use status of each placement rack area; and a rental management unit, electrically connected to the equipment information management and control unit so as to generate a rental basic data comprising a renter identification data, a rental deposit amount, a rental record and a return record, and in which the rental record is an event record data indicating at least one gas cylinder has been taken out from any one of the lease equipments, while the return record is an event record data indicating at least one gas cylinder has been returned to any one of the lease equipments.

More specifically, the control device of the lease main rack is internally set up with an operation interface software, and/or the cloud server equipment is internally set up with an operation interface software.

More specifically, the surface of the lease main rack is further installed with at least one display and control device capable of making connections to the cloud server equipment in order to execute and control the rental and/or return operations of the gas cylinders.

More specifically, the above-said further comprises an electronic device having an application unit, wherein the application unit is capable of connecting to the cloud server equipment and displaying the operation interface software installed within the application unit or the operation interface software installed within the cloud server equipment, thereby controlling the rental and/or return operations of the gas cylinders.

More specifically, the surface of the lease main rack is further installed with at least one fan device electrically connected to the control device, thereby facilitating accelerated air convection between the inside and outside of the lease main rack.

More specifically, wherein the inside and/or outside of the lease main rack is further installed with at least one camera device electrically connected to the control device, thereby photographing the image information about the inside and/or outside of the lease main rack and subsequently sending the acquired image information back to the control device.

More specifically, the inside of the lease main rack is further installed with at least one printer device electrically connected to the control device, thereby printing transaction invoices or other documents.

More specifically, the surface of the lease main rack is further installed with at least one face recognition device electrically connected to the control device, thereby capturing human face images and subsequently sending the acquired images back to the control device to perform facial recognitions.

More specifically, wherein the surface of the lease main rack is further installed with at least one card reader device electrically connected to the control device, thereby reading various sorts of cards and subsequently sending the acquired card information back to the control device, in which the card information may include the credit card information and/or identification information of the user.

More specifically, wherein the inside of each placement rack area is further installed with at least one positioning device, thereby fixedly placing at least one gas cylinder within the placement rack area.

More specifically, wherein the inside of the lease main rack is further installed with at least one positioning sensor device electrically connected to the control device, thereby detecting whether at least one gas cylinder is placed on the positioning device.

More specifically, wherein the surface of the lease main rack is further installed with at least one near field communication reader device electrically connected to the control device, thereby receiving near field communication information and subsequently sending the acquired near field communication information to the control device.

More specifically, wherein the surface of the lease main rack is further installed with multiple display lights electrically connected to the control device, thereby illuminating to indicate the open and/or close status of the openable door plate.

More specifically, wherein the inside of the lease main rack is further installed with at least one temperature sensor device electrically connected to the control device, thereby detecting the temperature information within the lease main rack and subsequently sending the acquired temperature information back to the control device.

More specifically, wherein the surface of the lease main rack is further installed with at least one barcode scanner device electrically connected to the control device, thereby scanning and extracting barcode information and subsequently sending the acquired barcode information back to the control device.

DETAILED DESCRIPTION OF THE PREFERRED EMBODIMENTS

Figure 1A:
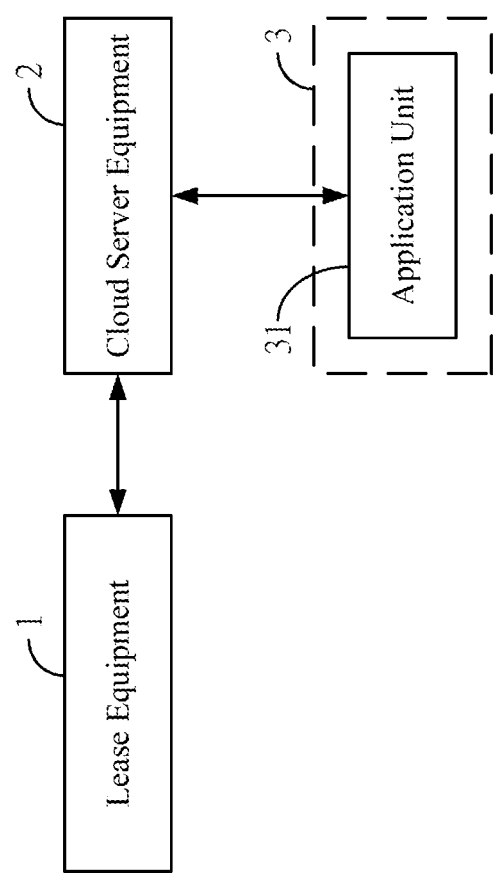
FIG. 1A shows an overall architecture view of the gas cylinder lease system according to the present invention.
Figure 1B:
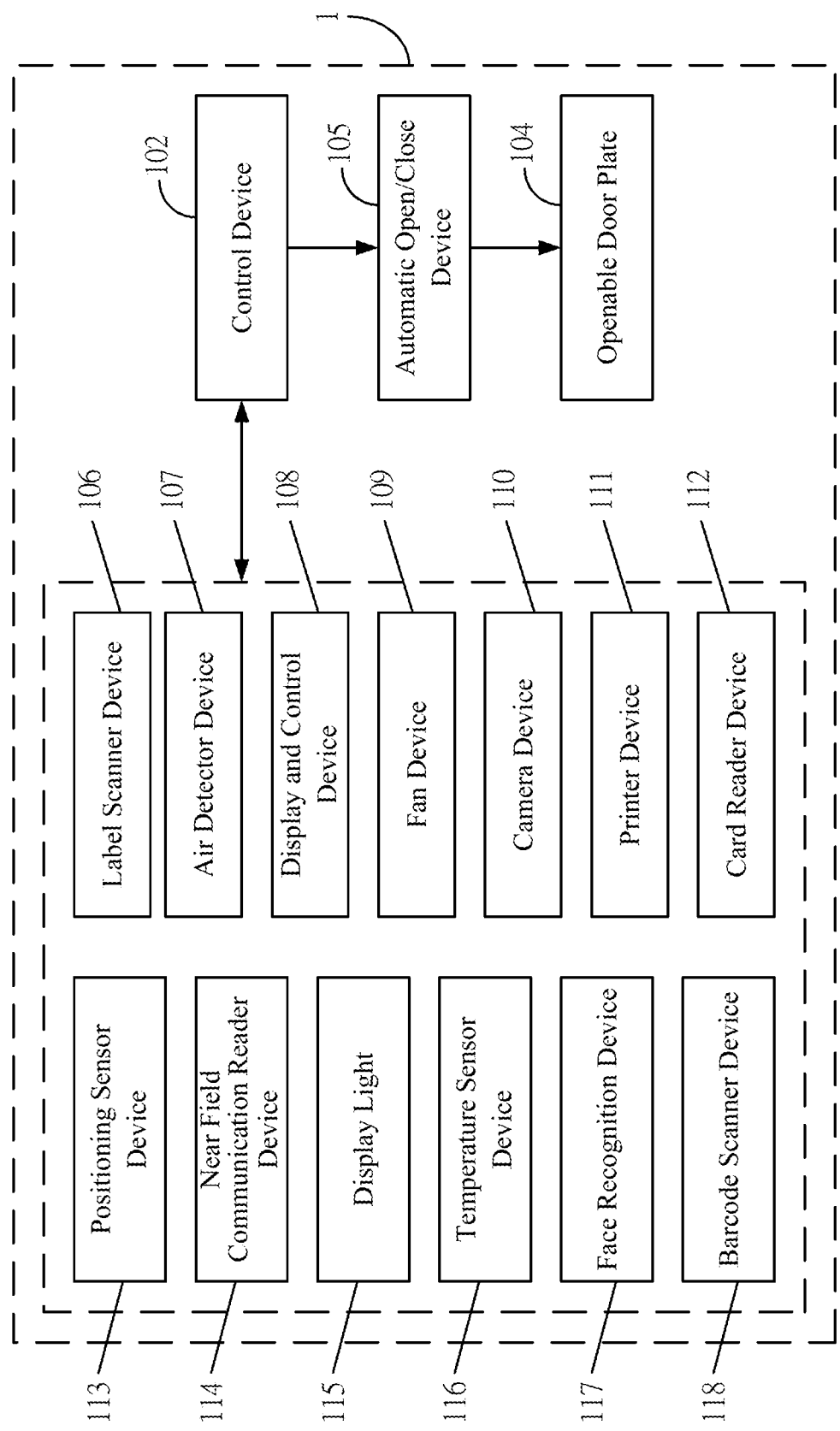
FIG. 1B shows an architecture view of the lease equipment in the gas cylinder lease system according to the present invention.
Figure 1C:
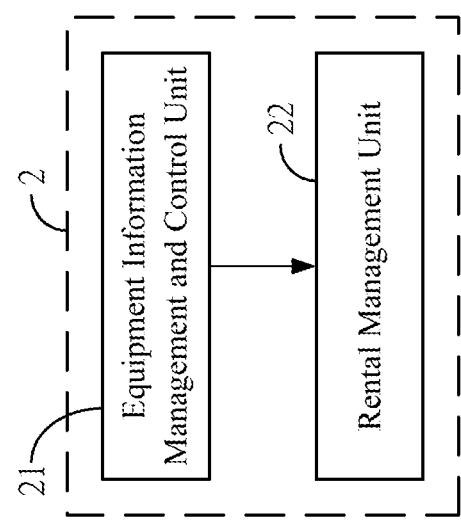
FIG. 1C shows an architecture view of the cloud server equipment in the gas cylinder lease system according to the present invention.
Figure 2A:
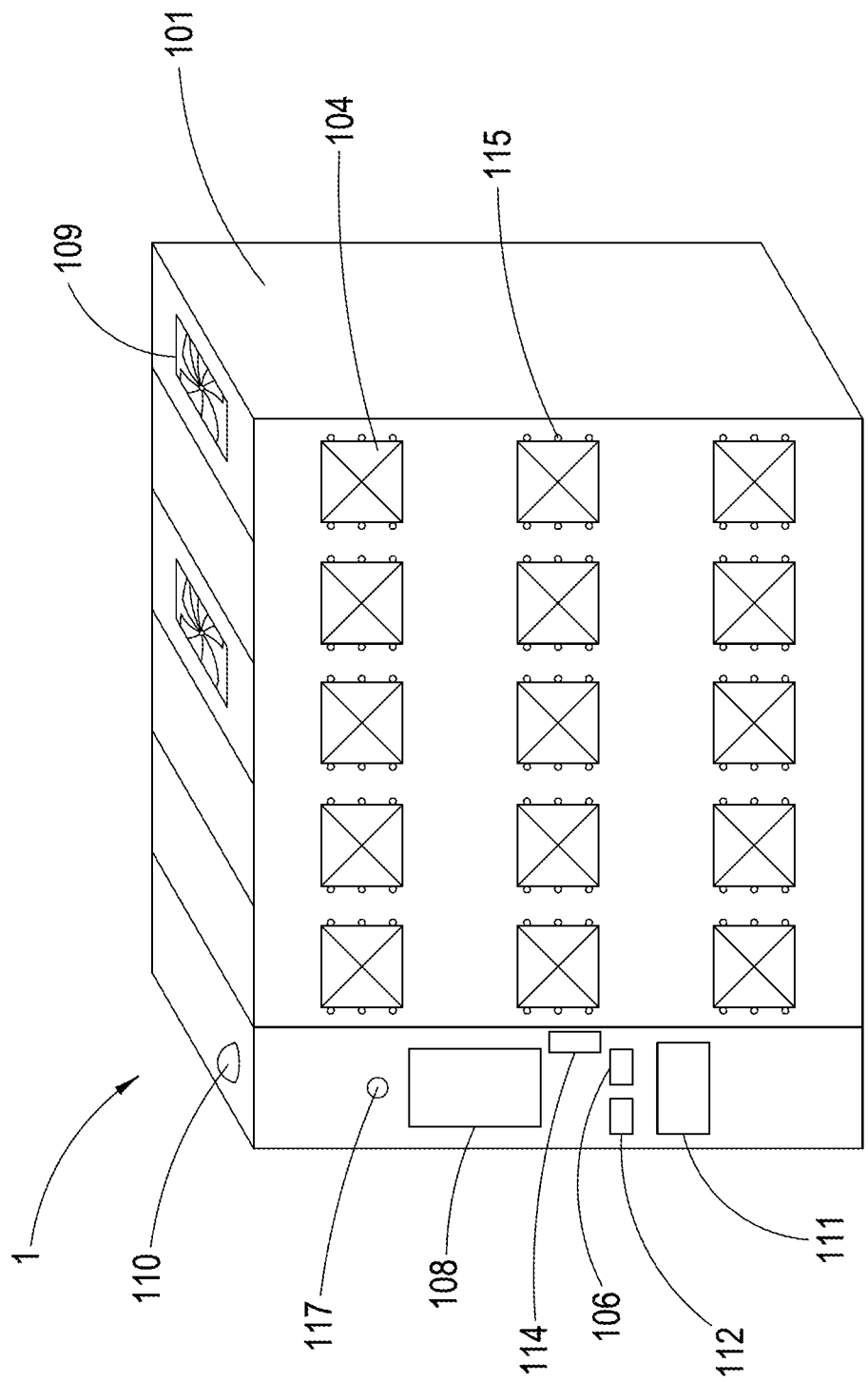
FIG. 2A shows a perspective view of the lease equipment in the gas cylinder lease system according to the present invention.
Figure 2B:
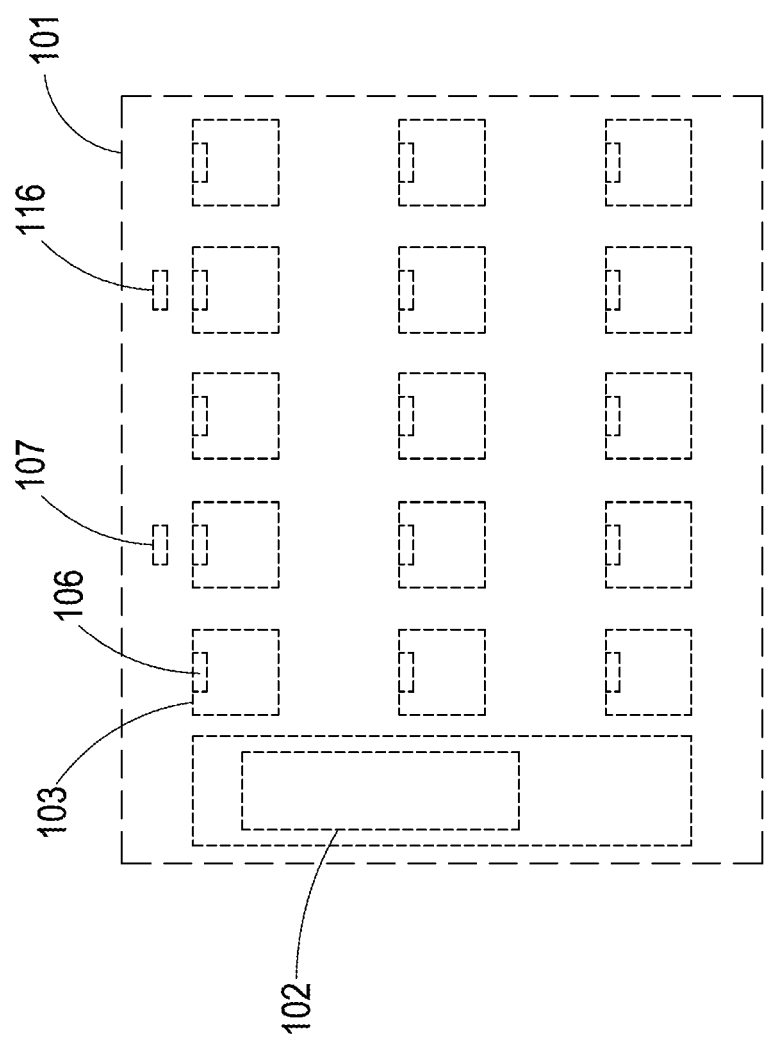
FIG. 2B shows an internal space view of the lease equipment in the gas cylinder lease system according to the present invention.

Other technical contents, aspects and effects in relation to the present invention can be clearly appreciated through the detailed descriptions concerning the preferred embodiments of the present invention in conjunction with the appended drawings.

Referring initially to FIGS. 1A~1C and 2A~2B, an overall architecture view and an architecture view of the migrated cloud equipment, an architecture view of the lease equipment, an architecture view of the cloud server equipment, a perspective view of the lease equipment as well as an internal space view of the lease equipment in the gas cylinder lease system according to the present invention are respectively shown, in which the illustrated gas cylinder lease system comprises one or more lease equipments 1 and a cloud server equipment 2.

Herein the lease equipment 1 comprises a lease main rack 101 which is a sort of explosion-proof cabinet, and the inside thereof is installed with at least one control device 102 and one or more placement rack area 103, wherein the control device 102 is set up to control the operations of the lease equipment 1 and allows network connection features thereby executing information reception and transmission processes via various networks.

In addition, a partition plate (not shown) having at least one ventilation opening may be further installed between every two placement rack areas 103 in order to facilitate air ventilation between them, with each placement rack area 103 accommodating at least one gas cylinder (the surface of the gas cylinder is provided with at least one identification label to indicate the gas contained therein is oxygen, carbon dioxide or inert gases).

Besides, for each placement rack area 103, an openable door plate 104 may be installed on the surface of the lease main rack 101, an automatic open/close device 105 installed between the openable door plate 104 and the placement rack area 103, and the automatic open/close device 105 can receive instructions from the control device 102 to automatically open or close the openable door plate 104 (also probably in conjunction with voice outputs upon opening or closing the openable door plate 104).

Figure 3:
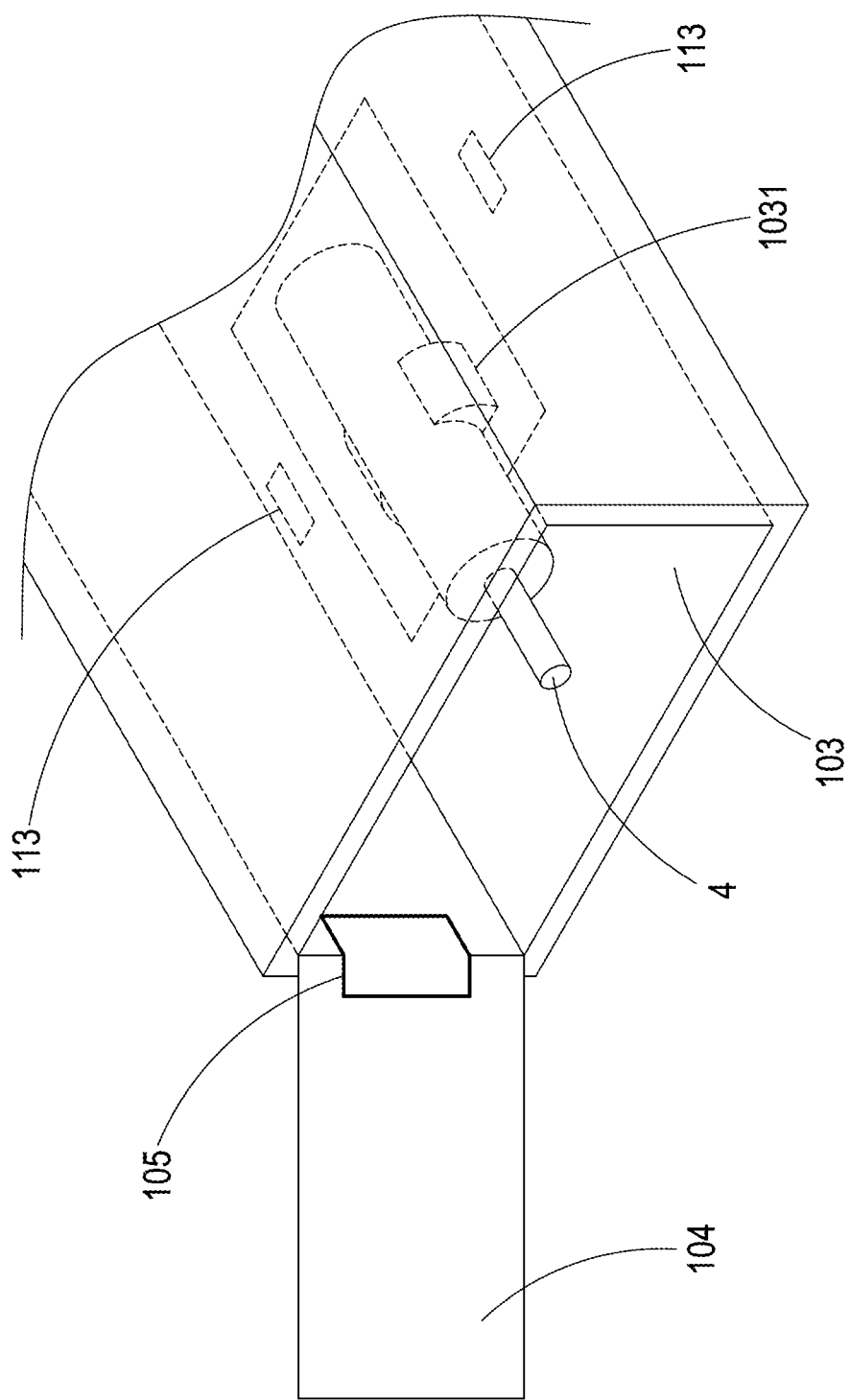
FIG. 3 shows an internal space view of the placement rack area in the lease equipment of the gas cylinder lease system according to the present invention.

Meanwhile, the inside of each placement rack area 103 is further installed with at least one positioning device 1031, as shown in FIG. 3, thereby stably placing at least one gas cylinder 4 within the placement rack area 103; moreover, the inside of the lease main rack 101 is further set up with at least one positioning sensor device 113 for determining whether at least one gas cylinder 4 is placed on the positioning device 103.

Additionally, the inside of the lease main rack 101 is further installed with at least one label scanner device 106 thereby scanning the identification label on the surface of the gas cylinder 4 (such an identification label may be an RFID barcode or QR Code), and the acquired gas cylinder information after scanning can be sent back to the control device 102 so as to verify the number of the gas cylinder 4 placed in the placement rack area 103 by way of the identification label, thus further determining whether the gas cylinder stored within the placement rack area 103 is compliant to relevant regulations.

Besides, the inside of the lease main rack 101 is further set up with at least one air detector device 107 thereby detecting the air data concerning the inside of the lease main rack 101, and the acquired air information after detection may be returned to the control device 102 so that it is possible to detect whether any air leakage issue occurs in the lease main rack 101, and the control device 102 can further transfer the detected air information to the cloud server equipment 2 to perform subsequent processes.

The surface of the lease main rack 101 is further installed with at least one display and control device 108 connectable to the cloud server equipment 2, in which the display and control device 108 includes the following two forms:

(1) the display and control device 108 has at least one display screen and at least one control button, in which the display screen can show the operation interface software installed inside the control device 102 or the operation interface software installed inside the cloud server equipment 2, and it is possible to press down the control button to execute the rental and/or return operations of the gas cylinder 4;

(2) the display and control device 108 may be alternatively configured as a touch screen which can show the operation interface software installed inside the control device 102 or the operation interface software installed inside the cloud server equipment 2, and it is possible to directly tap the touch screen to execute the rental and/or return operations of the gas cylinder 4.

In addition, the surface of the lease main rack 101 may be further installed with at least a fan device 109 to be activated by the control device 102 thereby providing accelerated air convection between the inside and outside of the lease main rack 101; as a result, in case the temperature sensor device 116 detects the internal temperature becomes unacceptably high, the control device 102 can automatically activate the fan device 109 to dissipate internal heat, or otherwise the cloud server equipment 2 can remotely control the control device 102 to start the fan device 109 for accelerated air ventilation.

Apparently, the inside and/or outside of the lease main rack 101 may be further installed with at least one camera device 110, in which the camera device 110 can capture image information concerning the inside and/or outside of the lease main rack 101 and transfer it back to the control device 102; also, the surface of the lease main rack 101 may be configured with multiple display lights 115 (e.g., LED lights) so as to illuminate for indicating the open and/or close status of the openable door plate 104.

Meanwhile, the inside of the lease main rack 101 can be also further set up with at least one printer device 111 to print various transaction invoices or other documents (for example, payment slips or receipts).

Moreover, the surface of the lease main rack 101 can be further installed with at least one card reader device 112, thereby reading various sorts of cards and subsequently sending the acquired card information back to the control device 102, in which the card information may include the credit card information and/or identification information of the user.

Also, the surface of the lease main rack 101 can be further installed with at least one near field communication reader device 114 for receiving near field communication information, and then the acquired near field communication information can be sent back to the control device 102 to be applied in third-party payments and employee or rental field owner log-in operations.

It is understandable that the inside of the lease main rack 101 can be further installed with at least one temperature sensor device 116 for measuring the temperature information about the inside of the lease main rack 101, and then transferring the acquired temperature information after measurements to the control device 102.

Again, the surface of the lease main rack 101 can be set up with at least one human face recognition device 117 which can capture human face images and return them to the control device 102 to execute facial recognitions; also, the surface of the lease main rack 101 can be installed with at least one barcode scanner device 118 thereby scanning to obtain barcode information and sending the acquired barcode information to the control device 102.

Herein the cloud server equipment comprises an equipment information management and control unit 21 and a rental management unit 22, in which the equipment information management and control unit 21 can be used to receive the internal status information of the lease equipment 1 and record for subsequent controls and processes; further, the internal status information of the lease equipment 1 may include the number of gas cylinders, gas cylinder information and gas data, and the equipment information management and control unit 21 can register the sale equipment location of each gas cylinder 4 and update the use status of each placement rack area 103 in real-time.

Additionally, the rental management unit 22 can be used to generate a rental basic data, wherein the rental basic data includes at least the renter identification data, rental deposit amount, rental record and return record, and in which the rental record is an event record data indicating at least one gas cylinder 4 has been taken out from any one of the lease equipments 1, while the return record is an event record data indicating at least one gas cylinder 4 has been returned to any one of the lease equipments 1.

Moreover, it further includes an electronic device 3 having an application unit 31 (herein the electronic device may be a desktop computer, notebook computer, smart phone or tablet computer or the like which is connectable to web pages for operations), and the application unit 31 can be connected to the cloud server equipment 2 and display the operation interface software installed inside the application unit or else the operation interface software installed inside the cloud server equipment on the electronic device 3, thus allowing to perform the rental and/or return operations of the gas cylinder 4.

Typically, before purchasing, the renter first needs to get online, use the application unit 31 or fill in the renter identity data through the lease equipment 1 to directly register; after the registration step, it is required to provide an amount of rental deposit in advance by means of, for example, online payment, convenient store payment, or a scanning payment tool of the lease equipment 1. If a user intends to rent a gas cylinder 4, there can be certain different rental methods illustrated as below:

(1) Entering the renter's identity data directly at any one of the lease equipments 1, then selecting the quantity and specification of the cylinders to be rented, and executing online payment or convenient store payment, such that the lease equipment 1 can automatically open the door plate thus allowing the renter to take out the gas cylinder 4.

(2) Scanning the barcode shown on the lease equipment 1 by way of a mobile phone directly at any one of the lease equipments 1 (the barcode may be attached to the surface of the lease equipment 1 or else displayed on the screen of the rental equipment 1), then connecting to the operation interface software built on the cloud server equipment 2, inputting the renter's identity data, and subsequently selecting the quantity and specification of the cylinders to be rented, and executing online payment or convenient store payment, such that the lease equipment 1 can automatically open the door plate thus allowing the renter to take out the gas cylinder 4.

(3) Using the renter's electronic device to connect to the operation interface software built in the cloud server equipment 2, inputting the renter's identity data, and subsequently selecting the quantity and specification of the cylinders to be rented, and executing online payment or convenient store payment, such that the cloud server equipment 2 can instruct the renter to go to an assigned lease equipment to take out the gas cylinder 4 (or alternatively the renter may autonomously inquire and select the lease equipment 1 from which the gas cylinder 4 can be accessed).

On the other hand, to return the gas cylinder 4, there may be also different approaches as set forth hereunder:

(1) Inputting the renter's identity data directly on any one of the lease equipments 1 and then selecting "RETURN" option, such that the lease equipment 1 can automatically open an empty placement rack area 103 thereby allowing the renter to put the gas cylinder 4 back in the placement rack area 103.

(2) Scanning the barcode shown on the lease equipment 1 by means of the mobile phone, thus connecting to the operation interface software built in the cloud server equipment 2, inputting the renter's identity data, and then selecting the "RETURN" option, such that the lease equipment 1 can automatically open an empty placement rack area 103 thereby allowing the renter to put the gas cylinder 4 back in the placement rack area 103.

(3) Using the renter's electronic device to connect to the operation interface software built in the cloud server equipment 2, inputting the renter's identity data, and subsequently selecting "RETURN" option, such that the cloud server equipment 2 can instruct the renter to go to an assigned lease equipment to return the gas cylinder 4 (or alternatively the renter may autonomously inquire and select the lease equipment 1 to which the gas cylinder 4 can be returned).

It can be figured that, since the renter needs to first provide an amount of rental deposit, in case the gas cylinder has not been returned upon exceeding the leasing time, the rental deposit will be automatically deducted, and the renter will be immediately notified via mobile phone number, E-mail or other approaches that the renter has not returned the gas cylinder yet and the rental deposit has been accordingly deducted.

Furthermore, because the cloud server equipment 2 can register or store relevant records every time the renter rents or returns the gas cylinder 4, the utilization condition of each rental equipment 1 can be effectively controlled so as to timely replenish the gas cylinders and appropriately instruct or allow the renter to autonomously inquire the locations of available machines for intended rental and return processes.

In comparison with other conventional technologies, the gas cylinder lease system according to the present invention provides the following advantages:

(1) the present invention combines gas cylinders with a rental equipment to allow rental, sale and return operations thereby facilitating renter's access and return actions;

(2) the present invention effectively controls the application condition of the placement rack areas in each lease equipment, thus enabling timely gas cylinder replenishment and also appropriately guiding or allowing the renter to autonomously inquire the locations of available machines for intended rental and return processes.

It should be noticed that, although the present invention has been disclosed through the detailed descriptions of the aforementioned embodiments, such illustrations are by no means used to restrict the scope of the present invention; that is, skilled ones in relevant fields of the present invention can certainly devise any applicable alternations and modifications after having comprehended the aforementioned technical characteristics and embodiments of the present invention without departing from the spirit and scope thereof. Hence, the scope of the present invention to be protected under patent laws should be delineated in accordance with the claims set forth hereunder in the present specification.

What is claimed is:

1. A gas cylinder lease system, comprising:
    one or more lease equipments, including:
        a lease main rack, internally configured with one or more placement rack areas, and each placement rack area being installed with an openable door plate on the surface of the lease main rack, in which each placement rack area accommodates a gas cylinder, and the surface of the gas cylinder includes at least an identification label;
        at least one control device, installed on the inside of the lease main rack thereby controlling the operations of the lease equipment, and the control device provides the network connection function so as to receive and transfer information via networks;
        at least one automatic open/close device, installed between the openable door plate and the placement rack area and electrically connected to the control device, in which the automatic open/close device is used to automatically open or close the openable door plate;
        at least one label scanner device, installed on the inside of the lease main rack and electrically connected to the control device, thereby scanning the identification label on the surface of the gas cylinder, and then the scanned gas cylinder information can be sent back to the control device;
        at least one air detector device, installed on the inside of the lease main rack and electrically connected to the control device, thereby detecting the air data within the lease main rack, and then the scanned air information can be sent back to the control device; and
    a cloud server equipment, performing connections with the lease equipment, and including:
        an equipment information management and control unit, used to receive and record the internal status information of the lease equipment for the purpose of management and control, in which the internal status information of the lease equipment includes at least the number of gas cylinders, gas cylinder information and air data, and the equipment information management and control unit is capable of recording the position of each lease equipment and updating in real-time the use status of each placement rack area; and
        a rental management unit, electrically connected to the equipment information management and control unit so as to generate a rental basic data comprising a renter identification data, a rental deposit amount, a rental record and a return record, and in which the rental record is an event record data indicating at least one gas cylinder has been taken out from any one of the lease equipments, while the return record is an event record data indicating at least one gas cylinder has been returned to any one of the lease equipments.

2. The gas cylinder lease system according to claim 1, wherein the control device of the lease main rack is internally set up with an operation interface software, and/or the cloud server equipment is internally set up with an operation interface software.

3. The gas cylinder lease system according to claim 2, wherein the surface of the lease main rack is further installed with at least one display and control device capable of making connections to the cloud server equipment in order to execute and control the rental and/or return operations of the gas cylinders.

4. The gas cylinder lease system according to claim 2, further comprising an electronic device having an application unit, wherein the application unit is capable of connecting to the cloud server equipment and displaying the operation interface software installed within the application unit or the operation interface software installed within the cloud server equipment, thereby controlling the rental and/or return operations of the gas cylinders, in which the electronic device may be a device such as desktop computer, notebook computer, smart phone or tablet computer, etc., which is connectable to web pages for operations.

5. The gas cylinder lease system according to claim 1, wherein the surface of the lease main rack is further installed with at least one fan device electrically connected to the control device, thereby facilitating accelerated air convection between the inside and outside of the lease main rack.

6. The gas cylinder lease system according to claim 1, wherein the inside and/or outside of the lease main rack is further installed with at least one camera device electrically connected to the control device, thereby photographing the image information about the inside and/or outside of the lease main rack and subsequently sending the acquired image information back to the control device.

7. The gas cylinder lease system according to claim 1, wherein the inside of the lease main rack is further installed with at least one printer device electrically connected to the control device, thereby printing transaction invoices or other documents.

8. The gas cylinder lease system according to claim 1, wherein the surface of the lease main rack is further installed with at least one face recognition device electrically connected to the control device, thereby capturing human face images and subsequently sending the acquired images back to the control device to perform facial recognitions.

9. The gas cylinder lease system according to claim 1, wherein the surface of the lease main rack is further installed with at least one card reader device electrically connected to the control device, thereby reading various sorts of cards and subsequently sending the acquired card information back to the control device, in which the card information may include the credit card information and/or identification information of the user.

10. The gas cylinder lease system according to claim 1, wherein the inside of each placement rack area is further installed with at least one positioning device, thereby fixedly placing at least one gas cylinder within the placement rack area.

11. The gas cylinder lease system according to claim 10, wherein the inside of the lease main rack is further installed with at least one positioning sensor device electrically connected to the control device, thereby detecting whether at least one gas cylinder is placed on the positioning device.

12. The gas cylinder lease system according to claim 1, wherein the surface of the lease main rack is further installed with at least one near field communication reader device electrically connected to the control device, thereby receiving near field communication information and subsequently sending the acquired near field communication information to the control device.

13. The gas cylinder lease system according to claim 1, wherein the surface of the lease main rack is further installed with multiple display lights electrically connected to the control device, thereby illuminating to indicate the open and/or close status of the openable door plate.

14. The gas cylinder lease system according to claim 1, wherein the inside of the lease main rack is further installed with at least one temperature sensor device electrically connected to the control device, thereby detecting the temperature information within the lease main rack and subsequently sending the acquired temperature information back to the control device.

15. The gas cylinder lease system according to claim 1, wherein the surface of the lease main rack is further installed with at least one barcode scanner device electrically connected to the control device, thereby scanning and extracting barcode information and subsequently sending the acquired barcode information back to the control device.

* * * * *